(12) United States Patent
Kim

(10) Patent No.: US 8,517,425 B2
(45) Date of Patent: Aug. 27, 2013

(54) ANCHOR PRETENSIONER STRUCTURE FOR CARS

(71) Applicants: Hyundai Motor Company, Seoul (KR); Kia Motors Corporation, Seoul (KR)

(72) Inventor: Tae Hoon Kim, Anyang-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 13/645,098

(22) Filed: Oct. 4, 2012

(65) Prior Publication Data

US 2013/0038048 A1 Feb. 14, 2013

Related U.S. Application Data

(62) Division of application No. 13/166,432, filed on Jun. 22, 2011.

(30) Foreign Application Priority Data

Dec. 8, 2010 (KR) .................. 10-2010-0124671

(51) Int. Cl.
*B60R 22/46* (2006.01)
(52) U.S. Cl.
USPC ............................................ 280/806
(58) Field of Classification Search
USPC ................ 280/801.2, 806; 297/480–482
See application file for complete search history.

(56) References Cited

U.S. PATENT DOCUMENTS

| 6,039,353 | A | * | 3/2000 | Bauer et al. | 280/806 |
| 6,155,512 | A | * | 12/2000 | Specht et al. | 242/374 |
| 7,887,096 | B2 | * | 2/2011 | Kohama | 280/806 |
| 2003/0090101 | A1 | * | 5/2003 | Ennerdal | 280/806 |
| 2003/0227166 | A1 | * | 12/2003 | Modinger et al. | 280/806 |
| 2004/0000783 | A1 | * | 1/2004 | Biller et al. | 280/806 |
| 2006/0279077 | A1 | * | 12/2006 | Nakano et al. | 280/806 |
| 2007/0029775 | A1 | * | 2/2007 | Tomita | 280/806 |
| 2009/0261569 | A1 | * | 10/2009 | Bok et al. | 280/806 |

FOREIGN PATENT DOCUMENTS

KR  10-0305928 B1  9/2001
KR  2003-0002154 A  1/2003

* cited by examiner

*Primary Examiner* — Joseph Rocca
*Assistant Examiner* — Robert A Coker
(74) *Attorney, Agent, or Firm* — Morgan, Lewis & Bockius LLP

(57) ABSTRACT

An anchor pretensioner structure for cars, may include an inflator mounted on a car-body plate to pull a seat belt upon a collision, a pretensioner wire made of a flexible material and connected to the inflator, a protector mounted to the pretensioner wire coupled to the seat belt, and an angle-adjuster to selectively rotate the pretensioner wire, depending upon whether or not a passenger may be sitting on a seat, so that the pretensioner wire may be allowed to rotate by a predetermined angle.

6 Claims, 5 Drawing Sheets

ANCHOR PRETENSIONER STRUCTURE FOR CARS

CROSS-REFERENCE TO RELATED APPLICATIONS

The present application is a Divisional of U.S. patent application Ser. No. 13/166,432, filed Jun. 22, 2011, which claims priority to Korean Patent Application Number 10-2010-0124671 filed on Dec. 8, 2010, the entire contents of which applications are is incorporated herein for all purposes by this reference.

BACKGROUND OF THE INVENTION

1. Field of the Invention

The present invention relates, in general, to an anchor pretensioner structure for cars and, more particularly, to an anchor pretensioner structure for cars, which prevents a passenger from tripping on the anchor pretensioner structure when the passenger gets into a rear seat of a 3-door or 2-door car.

2. Description of Related Art

Generally, car seat belts are primary safety devices for a driver and passengers and are required by law to be mounted in cars.

Such seat belts are intended to restrain the motion of the body of a driver and a passenger in order to reduce injuries when a car suffers an impact. However, seat belts that are too tight or loose make the injuries more severe, which is a problem in need of a solution.

To solve this problem, a pretensioner is provided in a retractor that constitutes the seat belt. In the normal operation, the pretensioner serves to both smoothly wind the belt that is pulled to fit the wearer's body, and upon an accident to forcedly and quickly wind the belt to reduce the wearer's injuries.

When getting into a rear seat of a 3-door or 2-door car, a passenger first has to push or fold a front seat forward and then get in the car. However, when doing so, because the entrance space is narrow, he/she often trips on an anchor pretensioner of the seat belt which is mounted in the front seat. This involves the danger of the occurrence of a safety accident, and accordingly may cause the manufacturer to become involved in a legal suit for product liability due to passenger injuries.

FIG. 1 schematically shows the cause of a passenger tripping.

In order to get into the rear seat of the 3-door or 2-door car, a passenger first folds a front seat 1 forward and then enters a space between the rear side 3 of a door panel and the front seat 1.

As indicated by the solid line, if the part of a protector 2 of an anchor pretensioner protrudes by a great amount from the rear side 3 of the door panel, the mounting angle at which a hook section of the belt is inserted into and fastened to the protector becomes small, which can reduce a sub marine phenomenon whereby upon a collision, the passenger comes out from under the seat belt. However, if the protector 2 protrudes to an excessive degree, the possibility of the rear passenger tripping also increases.

However, if the protector 2 is made to protrude by a smaller distance, the possibility of tripping becomes lower but the mounting angle of the seat belt increases correspondingly, thereby increasing the possibility of a sub marine occurring and having a negative influence on safety.

To solve this problem, the anchor pretensioner can be designed to be moved downwards, but this is a new design added to the structure of a car body, so that investment costs taken to study the new design such as re-analyzing the structural strength or the like, re-establishing a test platform, or the like are heavy.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an anchor pretensioner structure for cars which is capable of automatically regulating the degree of protrusion of an anchor pretensioner for a front passenger depending upon whether or not a passenger is sitting on a seat of a 3-door or 2-door car.

In an aspect of the present invention, the anchor pretensioner structure for cars, may include an inflator mounted on a car-body plate to pull a seat belt upon a collision, a pretensioner wire made of a flexible material and connected to the inflator, a protector mounted to the pretensioner wire coupled to the seat belt, and an angle-adjuster including a rotating disc rotatably mounted on the car-body plate and having in one side a hooking protrusion to selectively rotate the pretensioner wire, and a rotary driver body engaged to the rotating disc to rotate the rotating disc depending upon whether or not a passenger may be sitting on a seat, so that the pretensioner wire may be allowed to rotate by a predetermined angle.

When the passenger sits on a seat, the rotary driver body actuates the rotating disc to rotate the pretensioner wire in a direction in which a degree of protrusion of the protector towards an entrance space may be decreased.

In another aspect of the present invention, the anchor pretensioner structure for cars, may include an inflator mounted on a car-body plate to pull a seat belt upon a collision, a pretensioner wire made of a flexible material and connected to the inflator, a protector mounted to the pretensioner wire coupled to the seat belt, and an angle-adjuster having a linear drive body mounted on the car-body plate, and an operating rod mounted in one side of the linear drive body, wherein the operating rod moves in association with the pretensioner wire while linearly reciprocating, and wherein the linear driver body may be adapted to linearly move the operating rod depending upon whether or not a passenger may be sitting on a seat, so that the pretensioner wire may be allowed to rotate by a predetermined angle.

A housing may be provided between the inflator and the linear drive body and may have a hinge point with a curved surface, the hinge point serving as a center of rotation, and wherein when the operating rod moves linearly, the pretensioner wire rotates about the curved surface of the hinge point.

When the passenger sits on a seat, the linear driver body actuates the operating rod to rotate the pretensioner wire in a direction in which a degree of protrusion of the protector towards an entrance space may be decreased.

According to the anchor pretensioner structure for cars of the present invention, when a passenger gets in a rear seat of a 3-door or 2-door car, the pretensioner of a seat belt for a front seat minimally protrudes into an entrance space, preventing the passenger from tripping on the pretensioner.

Further, in addition to this effect, when a front passenger wears a seat belt, a mounting angle of the pretensioner is minimized, thereby providing the effect of preventing a sub marine phenomenon and ensuring maximal safety.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
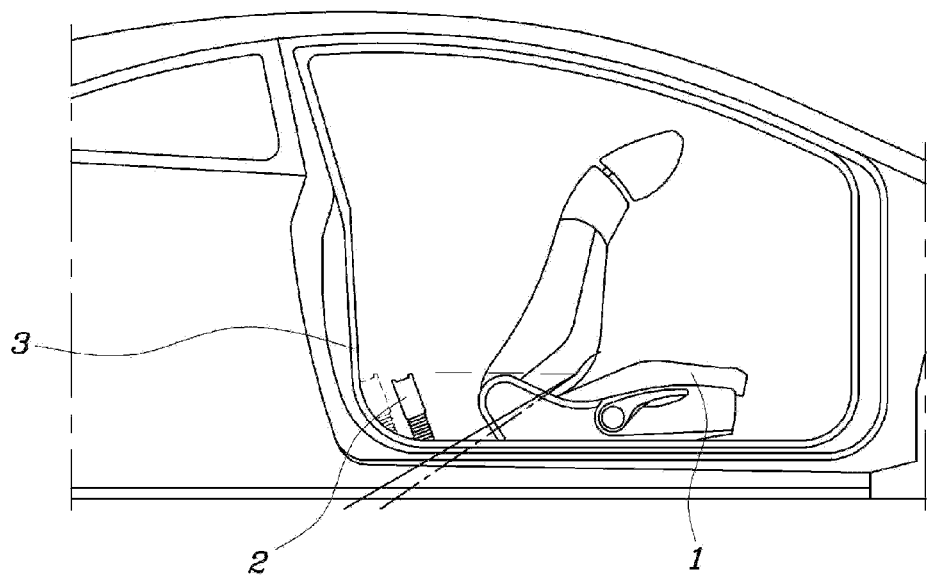
FIG. 1 is a view showing a problem of a conventional anchor pretensioner structure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to embodiments of the invention with reference to the accompanying drawings.

To help one understand an anchor pretensioner structure for cars according to an exemplary embodiment of the present invention, a general structure of a conventional anchor pretensioner will now be simply described with reference to FIG. 2.

The anchor pretensioner structure for cars includes an inflator 10 mounted on a car-body plate to pull a seat belt upon collision, a pretensioner wire 11 made of a flexible material and connected to the inflator 10, and a protector 14 mounted to the pretensioner wire 11.

The pretensioner wire 11 is connected to the seat belt in the inside of the protector 14, and is designed to tighten the seat belt by rapidly drawing itself into the inflator 10 when the inflator 10 is activated.

A housing 12 and a mounting bracket 13 are mounted in front of the inflator 10 by the medium of a variety of caulking members for air tightness. The housing 12 and the mounting bracket 13 are fixed to the car-body plate and serve to guide the pretensioner wire 11 when drawn. For this, the housing 12 is provided on the front face with a hinge point 12a having a guide curve 12b to allow the pretensioner wire to move along the guide curve while bringing the pretensioner wire into close contact with the guide curve. Of course, the guide curve may be formed on the front face of the mounting bracket 13.

The present invention is a technology that adds the construction for preventing a rear passenger from tripping when getting into a rear seat, to the conventional anchor pretensioner structure. The invention can be implemented by the following two embodiments.

Figure 3:
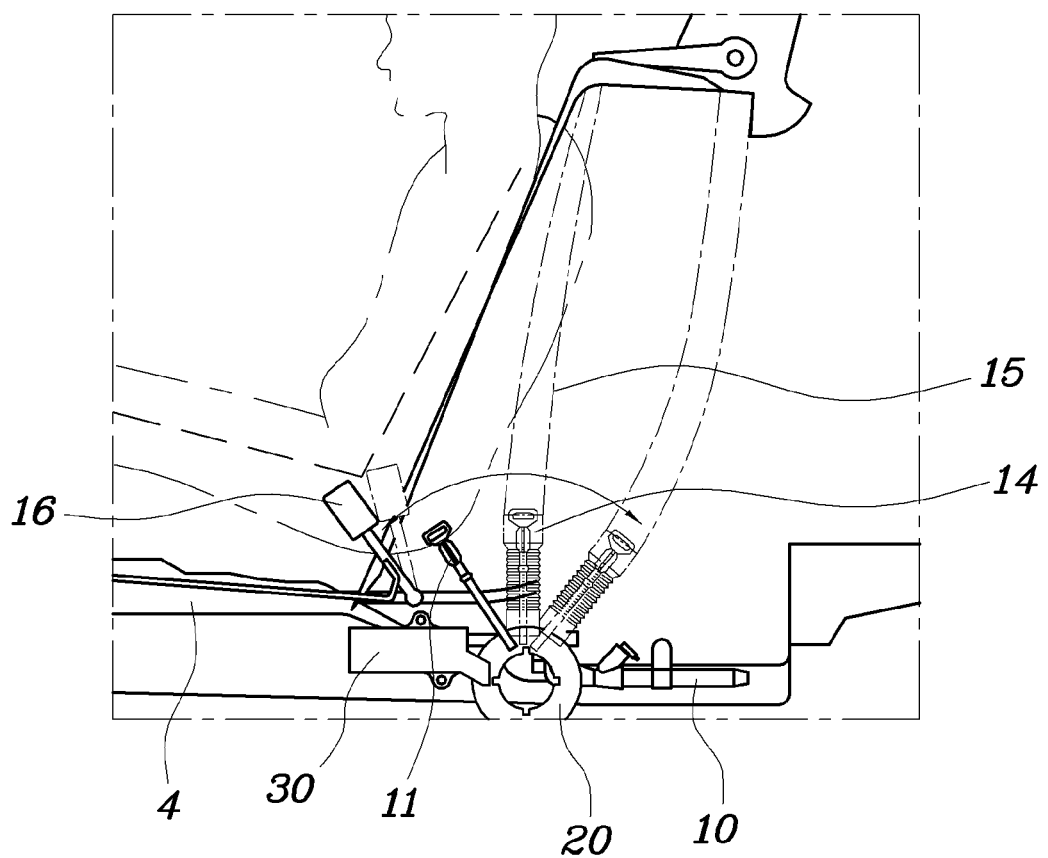
FIG. 3 is a view showing an exemplary embodiment of an anchor pretensioner structure for cars according to an exemplary embodiment of the present invention.
Figure 4:
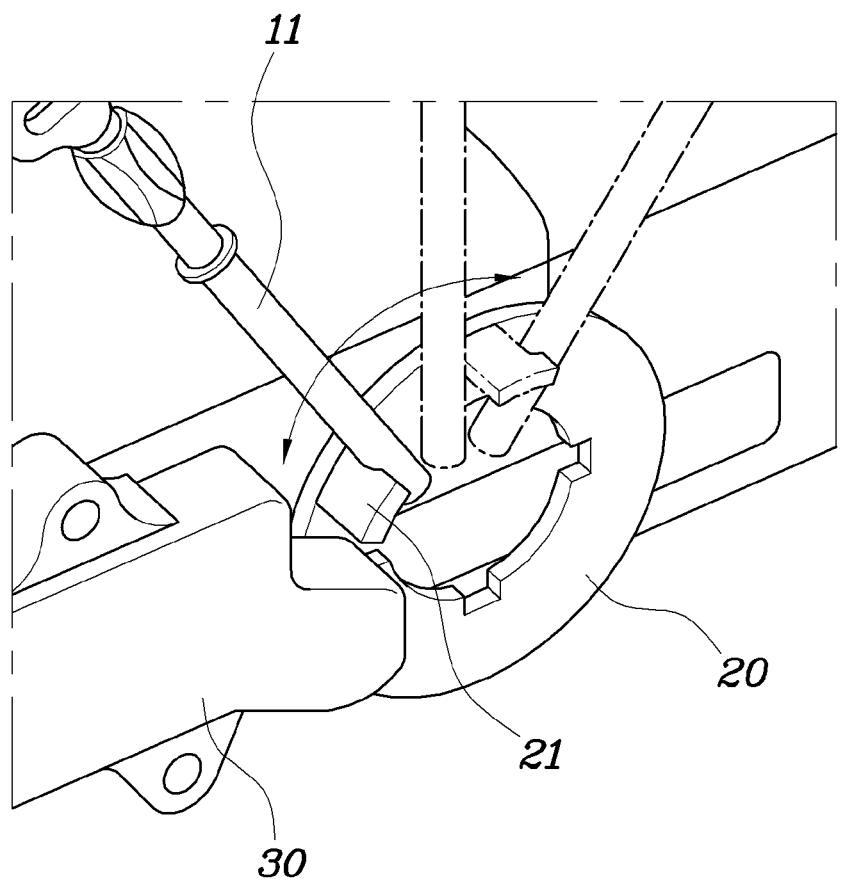
FIG. 4 is a partially detailed view of FIG. 3.

FIGS. 3 and 4 show various exemplary embodiments of an anchor pretensioner structure for cars according to an exemplary embodiment of the present invention.

Figure 2:
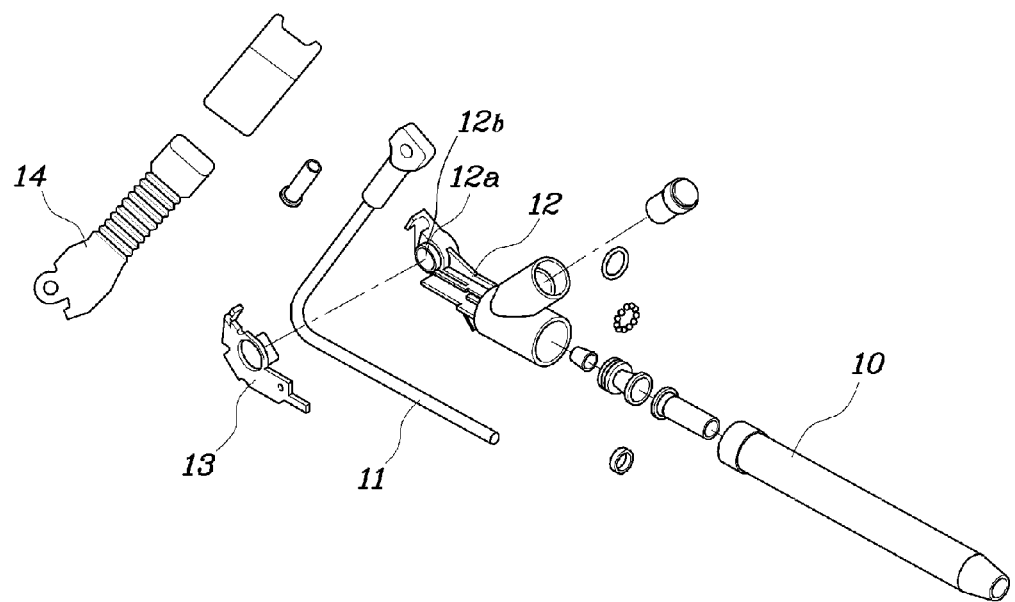
FIG. 2 is a view showing an anchor pretensioner structure for cars.

The anchor pretensioner structure for cars has the same structure as shown in FIG. 2 in that the structure includes an inflator 10 mounted on a car-body plate 4 to pull a seat belt 15 upon a collision, a pretensioner wire 11 made of a flexible material and connected to the inflator 10, and a protector 14 mounted to the pretensioner wire 11.

However, in this embodiment, an angle-adjuster is further provided, which includes a rotating disc 20 which is rotatably mounted on the car-body plate 4 and has in one side a hooking protrusion 21 rotating the pretensioner wire 11, and a rotary driver body 30 which is connected to the rotating disc 20 to rotate the rotating disc 20 depending upon whether or not a passenger is sitting on a seat, so as to allow the pretensioner wire 11 to rotate by a certain angle.

It is preferred that the rotating disc 20 be rotatably mounted to a position where as shown in FIG. 2, the housing 12 and the mounting bracket 13 are mounted in the conventional construction, so as to further serve as the center of rotation of the pretensioner wire 11.

The rotary driver body 30 rotates the rotating disc 20 by a certain angle depending upon whether or not a passenger is sitting on the seat. Here, the hooking protrusion 21 formed on one side of the rotating disc 20 hooks the body of the pretensioner wire 11 and rotates by a certain angle together with the rotating disc 20.

The rotary driver body 30 may simply have a bevel gear structure or a pinion and rack structure, so that it allows the rotating disc 20 to rotate along a rotating surface that meets at 90° with a rotating surface of a driving motor mounted therein. Further, the rotary driver body may be of the same structure as a wiper motor driver body that reciprocatingly rotates a wiper by a certain angle. Like this, the rotary driver body 30 can be easily conceivable from the related art, so the detailed description thereof will be omitted.

Further, the rotary driver body 30 may be configured so that when a passenger sits on a seat the pretensioner wire 11 is allowed to rotate in a direction in which the degree of protrusion of the protector 14 towards an entrance space is decreased.

The pretensioner wire 11 indicated by the solid line in FIGS. 3 and 4 has a level at which a mounting angle of a seat belt becomes lower so as to maximally ensuring the safety of a passenger who wears the seat belt, but the degree of protrusion into the entrance space becomes higher so as to increase the risk of a passenger tripping. On the contrary, the pretensioner wire 11 indicated by the dotted line is rotated by a certain angle by the rotary driver body 30, and is located at a position where it minimally protrudes into the entrance space, preventing the passenger from tripping thereon.

A controller which is separately provided or built in the rotary driver body 30 receives a signal, such as a grounding signal of a center buckle 16 that checks whether or not the seat belt 15 is locked, a status signal related to a length of the belt drawn from or wound around a retractor, a status signal related to the sitting position of a passenger, a signal about the driving conditions of a car, or the like, analyzes the signal to determine whether or not a passenger is sitting on a rear seat, and outputs an operating signal to the rotary driver body 30.

For example, in the state in which a 2-door car stops after being driven a certain distance, and when a front passenger gets out of the car after unlocking the seat belt from the center buckle 16, the controller anticipates a rear passenger getting out and operates the rotary driver body 30 to allow the pretensioner wire 11 to rotate from a solid line position to a dotted line position, i.e. towards the front seat, thereby minimizing the degree of protrusion of the protector 14 into an entrance space.

Figure 5:
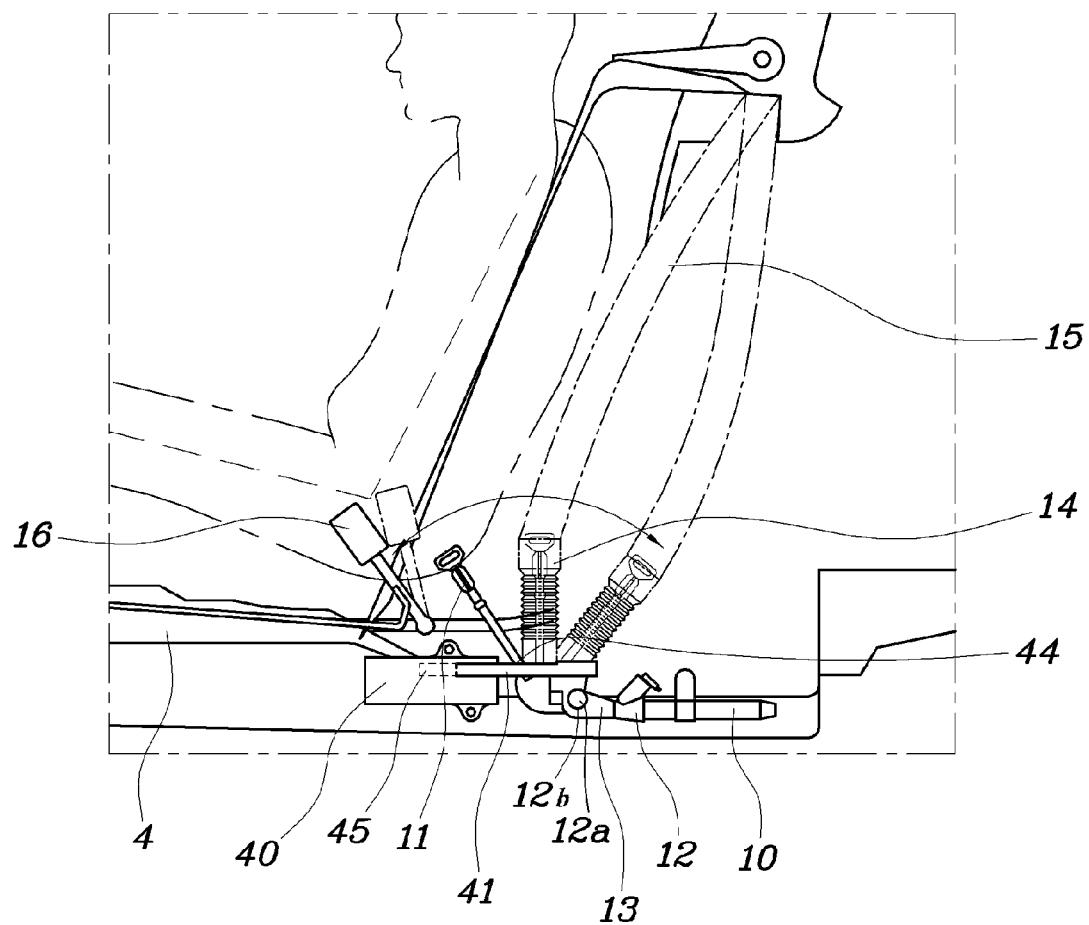
FIG. 5 is a view showing another embodiment of an anchor pretensioner structure according to an exemplary embodiment of the present invention.

FIG. 5 shows various exemplary embodiments of an anchor pretensioner structure for cars according to an exemplary embodiment of the present invention.

The exemplary embodiment further includes an angle-adjuster which includes a linear driver body 40 which is mounted on the car-body plate 4 and has in one side an operating rod 41 that is engaged into a sliding hole 45 formed in the linear driver body 4 and moves in association with the pretensioner wire 11 while linearly reciprocating along the sliding hole 45. The linear driver body is adapted to linearly move the operating rod 41 depending upon whether or not a passenger is sitting on a seat, so as to allow the pretensioner wire 11 to rotate by a certain angle.

The linear driver body 40 may be configured so that the operating rod 41 linearly reciprocates by simply using a pneumatic or hydraulic cylinder or an electric motor and cam structure. Further, a variety of linearly-reciprocating structures can be adapted with a modification of a design required.

The linear driver body 40 may be configured to, when a passenger sits on a seat, allow the pretensioner wire 11 to rotate in a direction toward which the degree of protrusion of the protector 14 towards an entrance space is made smaller.

Further, in this embodiment, since there is no member, such as the rotating disc of the various exemplary embodiments, serving as the center of rotation of the pretensioner wire, a housing 12 is provided in front of the inflator 10, the housing having hinge point 12a with a curved surface 12b, the hinge point 12a serving as the center of rotation of the pretensioner wire 11. Then, when the operating rod 41 moves linearly, the pretensioner wire 11 coupled into an engaging hole 44 formed in the operating hole 41 rotates about the curved surface 12b of a hinge point 12a. The curved surface 12b of a hinge point 12a is substantially the same as the guide curve 12b of a hinge point 12a shown in FIG. 2, so it is designated as the same reference numeral as the guide curve.

Since this embodiment has the same construction as that of the various exemplary embodiments shown in FIGS. 3 and 4, except for the description of how the linear driver body 40 rotates the pretensioner wire 11 while linearly reciprocating, the operation of the controller and pretensioner wire 11 can refer to the related description of the various exemplary embodiments.

Although a exemplary embodiment of the present invention has been described for illustrative purposes, those skilled in the art will appreciate that various modifications, additions and substitutions are possible, without departing from the scope and spirit of the invention as disclosed in the accompanying claims.

For convenience in explanation and accurate definition in the appended claims, the terms "upper", "lower", "inner", "outer" "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An anchor pretensioner structure for cars, comprising:
    an inflator mounted on a car-body plate to pull a seat belt upon a collision;
    a pretensioner wire made of a flexible material and connected to the inflator;
    a protector mounted to the pretensioner wire coupled to the seat belt; and
    an angle-adjuster having:
        a linear drive body mounted on the car-body plate; and
        an operating rod slidably mounted in one side of the linear drive body,
    wherein the pretensioner wire is engaged to the operating rod and wherein the operating rod moves in association with the pretensioner wire in linearly reciprocating through the linear drive body while the inflator actuates the operating rod, and
    wherein the inflator is adapted to linearly move the operating rod depending upon whether or not a passenger is sitting on a seat, so that the pretensioner wire is allowed to rotate by a predetermined angle when the operating rod linearly moves by actuation of the inflator.

2. The anchor pretensioner structure for the cars according to claim 1,
    wherein a housing is provided between the inflator and the linear drive body and has a hinge point with a curved surface to which the pretensioner wire is engaged, the hinge point serving as a center of rotation, and
    wherein when the operating rod moves linearly, the pretensioner wire rotates about the curved surface of the hinge point.

3. The anchor pretensioner structure for the cars according to claim 1, wherein when the passenger sits on a seat, the inflator actuates the operating rod to rotate the pretensioner wire in a direction in which a degree of protrusion of the protector towards an entrance space is decreased.

4. The anchor pretensioner structure for the cars according to claim 3, wherein a housing is provided between the inflator and the linear drive body and has a hinge point with a curved surface to which the pretensioner wire is coupled, the hinge point serving as a center of rotation, and wherein when the operating rod moves linearly, the pretensioner wire rotates about the curved surface of the hinge point.

5. The anchor pretensioner structure for the cars according to claim 1,
    wherein the operating rod includes an engaging hole into which the pretensioner wire is coupled; and
    wherein the linear driver body includes a sliding hole through which a portion of the operating rod is engaged and reciprocates therein.

6. The anchor pretensioner structure for the cars according to claim 5, wherein the protector is coupled to the pretensioner wire.

* * * * *